L. F. BULLÔT.
APPARATUS FOR THE PRESERVATION OF MEAT AND OTHER ALIMENTARY SUBSTANCES.
APPLICATION FILED MAY 14, 1920.

1,414,859.

Patented May 2, 1922.

Inventor
Louis F. Bullôt
by
Attorney

UNITED STATES PATENT OFFICE.

LOUIS FREDERICK BULLÔT, OF SYDNEY, NEW SOUTH WALES, AUSTRALIA.

APPARATUS FOR THE PRESERVATION OF MEAT AND OTHER ALIMENTARY SUBSTANCES.

1,414,859.      Specification of Letters Patent.      Patented May 2, 1922.

Application filed May 14, 1920. Serial No. 381,367.

*To all whom it may concern:*

Be it known that I, LOUIS FREDERICK BULLÔT, a subject of the King of Great Britain, residing at Sydney, in the State of New South Wales, Commonwealth of Australia, have invented certain new and useful Improvements in Apparatus for the Preservation of Meat and Other Alimentary Substances, of which the following is a specification.

This invention relates to improvements in apparatus for preserving meat and the like in which fumes generated in a separate combustion chamber pass on ignition of a fumigating mixture by a pipe into a chamber containing the meat or other substance to be treated and air in the latter chamber is led by a pipe near the bottom into the combustion chamber at the floor level. The invention has for its objects means for ensuring more even combustion of the fumigating charge in the separate vessel or chamber, and means whereby any animal heat given off from the carcasses in the treatment chamber is removed therefrom.

According to the present invention, the air pipe leading from about the bottom of the treatment chamber into the lower end of the combustion chamber discharges into a small box or compartment within the latter. This box is provided with orifices which communicate with the combustion chamber. The air from the treatment chamber is thereby discharged evenly into the combustion chamber and promotes an even combustion of the fumigating charge, the fumes from which are led to the bottom of the treatment chamber. Preferably there are two or more combustion chambers to each treatment chamber and situated at some distance away so that the fumes may be cooled before reaching the treatment chamber. The treatment chamber may have a gable roof in which is placed a controlled valve for escape of the animal heat arising from the carcasses and to indicate when the chamber is fully charged with the fumes. Or above the treatment chamber I may secure a closed tank or chamber communicating therewith by one or more passages or pipes up which any animal heat rising from the carcasses passes and is retained in the tank. These pipes or passages may be controlled by valves and the tank is provided at top with a controlled escape pipe whereby the heated air or fumes may be discharged as may be necessary.

Referring to the accompanying sheet of drawings—

Figure 2 is a sectional elevation through a combustion chamber and the adjoining portion of the treatment chamber, while

The same numerals indicate the same or corresponding parts.

Figure 1:
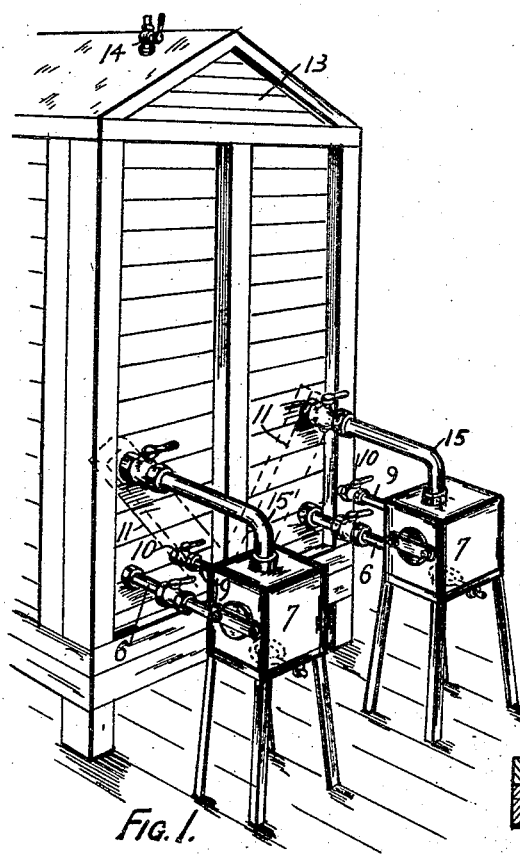
Figure 1 is a perspective view of apparatus illustrating the invention.
Figure 2:
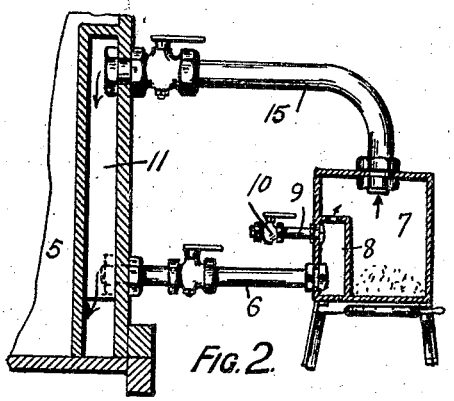
Figure 3:
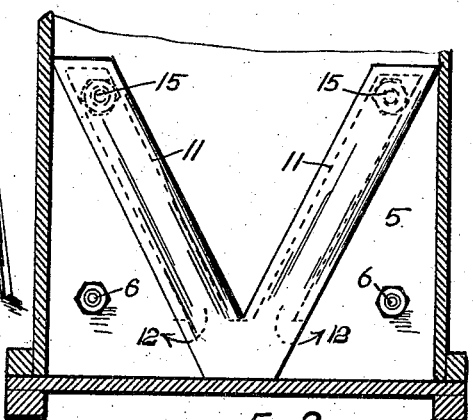
Figure 3 is a section illustrating the end of a treatment chamber.

5 is a treatment chamber from which the pipe 6 conducts air to the bottom of the combustion chamber 7. This pipe 6 discharges into a perforated box 8 or baffle whereby the air is evenly distributed in said chamber 7. Above the pipe 6 is an air pipe 9 which is opened when required by turning cock 10 when the supply of air from the chamber 5 diminishes. The fumes generated in chamber 7 pass up the fume pipe 15 and down a passage 11 preferably positioned angularly at the end of the chamber 5 and emerge near the floor through an opening 12 so that the animal heat and other objectionable gases are gradually forced upwardly towards the roof of the chamber. This is preferably a gable roof 13 whereby the objectionable gases are concentrated and permitted to escape through the valve 14.

Having now fully described and ascertained my said invention and the manner in which it is to be performed, I declare that what I claim is:—

1. In an apparatus for the preservation of meat and other alimentary substances, the combination with a combustion chamber, of a treatment chamber connected thereto by upper and lower tubular conduits for the discharge of air from the treatment chamber into the combustion chamber and admission of fumes into the treatment chamber, and a perforated enclosure around the delivery end of the tubular conduit within the combustion chamber for inducing more regular and even combustion in the latter chamber.

2. In an apparatus for the preservation of meat and other alimentary substances, a combustion chamber, a treatment chamber, upper and lower pipes connected to the combustion chamber and treatment chamber respectively for transmission of fumes from the combustion chamber into the treatment chamber and of air from the treatment chamber into the combustion chamber, and a downwardly enclosed passage within the treatment chamber having communication with the lower portion of the latter chamber and also with the pipe for the fumes to convey the fumes to the lower part of the treatment chamber.

3. In an apparatus for the preservation of meat and other alimentary substances, the combination of a treatment chamber having a V-shaped passage therein communicating with the bottom thereof, combustion chambers disposed exteriorly of the treatment chamber, and pipes connecting the upper and lower portions of the combustion chambers with the treatment chamber for respectively admitting fumes into the treatment chamber and discharging air from the latter chamber into the combustion chambers, the fume pipes discharging into the V-shaped passage of the treatment chamber.

In testimony whereof I have hereunto set my hand.

LOUIS FREDERICK BULLÔT.